US011512799B2

United States Patent
Pallini et al.

(10) Patent No.: US 11,512,799 B2
(45) Date of Patent: Nov. 29, 2022

(54) SYSTEM AND METHOD FOR ANTI-ROTATION BETWEEN TUBULARS

(71) Applicant: Baker Hughes Oilfield Operations LLC, Houston, TX (US)

(72) Inventors: Joseph Pallini, Houston, TX (US); Dennis R Martinchich, Houston, TX (US); Matthew Lord, Houston, TX (US); Alejandro Rodela, Houston, TX (US); Xichang Zhang, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 69 days.

(21) Appl. No.: 16/922,473

(22) Filed: Jul. 7, 2020

(65) Prior Publication Data

US 2022/0010895 A1 Jan. 13, 2022

(51) Int. Cl.
*F16L 15/08* (2006.01)
*F16L 15/00* (2006.01)

(52) U.S. Cl.
CPC ............ *F16L 15/08* (2013.01); *F16L 15/002* (2013.01)

(58) Field of Classification Search
CPC ................................. F16L 15/08; F16L 15/002
USPC .......................................................... 285/92
See application file for complete search history.

(56) References Cited

U.S. PATENT DOCUMENTS

| 4,406,485 A * | 9/1983 | Giebeler | F16L 37/00 |
| | | | 285/92 |
| 4,711,471 A | 12/1987 | Pallini, Jr. et al. | |
| 9,410,647 B2 | 8/2016 | Steen et al. | |
| 10,605,012 B2 * | 3/2020 | Loose-Mitchell | F16L 15/08 |
| 2011/0260445 A1 | 10/2011 | Watterson | |
| 2014/0103640 A1 * | 4/2014 | O'Dell | F16L 15/08 |
| | | | 285/91 |

(Continued)

FOREIGN PATENT DOCUMENTS

WO 2016/205262 12/2016

OTHER PUBLICATIONS

McGowan et al., "Development of a Safe and Fast Bite Locking Cam for Oil & Gas Applications," Society of Petroleum Engineers 2015.

(Continued)

*Primary Examiner* — David Bochna
(74) *Attorney, Agent, or Firm* — Hogan Lovells US LLP (57) ABSTRACT

A system for blocking rotation between a first tubular and a second tubular includes a key positioned within a recess formed in the first tubular. The system also includes a retention fastener securing the key to the first tubular, the retention fastener being arranged within an elongated aperture extending through the key. The system further includes an installation fastener moving the key from a storage configuration when in a first position to an engaged configuration when in a second position, the installation fastener having a tapered face that engages at least a portion of the key. The system also includes teeth arranged along a bottom portion of the key, proximate the second tubular, the teeth engaging the second tubular via rotation of the key about the retention fastener and blocking rotation of the first tubular relative to the second tubular in a first direction.

18 Claims, 10 Drawing Sheets

(56) References Cited

U.S. PATENT DOCUMENTS

| | | | | |
|---|---|---|---|---|
| 2014/0103645 | A1* | 4/2014 | Steen | F16L 15/08 |
| | | | | 285/330 |
| 2014/0125053 | A1* | 5/2014 | Raynal | F16L 15/08 |
| | | | | 285/333 |
| 2016/0356096 | A1* | 12/2016 | DeBerry | F16L 15/08 |
| 2016/0356097 | A1* | 12/2016 | DeBerry | F16L 15/08 |
| 2016/0369920 | A1* | 12/2016 | Pallini, Jr. | F16L 15/08 |
| 2017/0101828 | A1 | 4/2017 | McGowan et al. | |
| 2018/0231155 | A1 | 8/2018 | Ellisor | |

OTHER PUBLICATIONS

"Specialty Connectors," DRIP-QUIP, Dec. 7, 2016.
International Search Report and Written Opinion dated Nov. 3, 2021 in corresponding PCT Application No. PCT/US2021/070823.

\* cited by examiner

SYSTEM AND METHOD FOR ANTI-ROTATION BETWEEN TUBULARS

BACKGROUND

1. Field of Disclosure

This disclosure relates in general to oil and gas tools, and in particular, to systems and methods for blocking or preventing rotation between tubular components.

2. Description of the Prior Art

Hydrocarbon production wells can have several strings of casing of differing diameters cemented in the well, as well as tubular piping sections that extend through the casings, such as sections supported on hangers. Each casing string can be made up of sections of pipe having threaded ends that are secured together. Some casing joints have external threads on their upper and lower ends. A casing collar with internal threads often secures the threaded ends together. The portion of the connector having internal threads is commonly known as a female connector or box. The portion of the connector having external threads is commonly known as a male connector or pin. Normally, the operator relies on the friction of the made-up joint to prevent the threaded connectors from loosening while running the string into the well. Anti-rotation keys may be incorporated to prevent loosening. However, these tools often use specialty tools for installation, which may be difficult, expensive, and/or time consuming to install. For example, certain anti-rotation keys may be installed through the box and then hammered into position. The key includes teeth that bite into the connector members, either upon insertion or when the pin starts to rotate out of the box, applying an axial compressive load on the connector members and permanently deforming the connector members in order to prevent relative rotation between the box and the pin.

SUMMARY

Applicant recognized the problems noted above herein and conceived and developed embodiments of systems and methods, according to the present disclosure, for blocking or reducing rotation between threaded components.

In an embodiment, a system for blocking rotation between a first tubular and a second tubular includes a key positioned within a recess formed in the first tubular, the first tubular arranged uphole of the second tubular. The system also includes a retention fastener securing the key to the first tubular, the retention fastener being arranged within an elongated aperture extending through the key. The system further includes an installation fastener moving the key from a storage configuration when in a first position to an engaged configuration when in a second position, the installation fastener having a tapered face that engages at least a portion of the key. The system also includes teeth arranged along a bottom portion of the key, proximate the second tubular, the teeth engaging the second tubular via rotation of the key about the retention fastener and blocking rotation of the first tubular relative to the second tubular in a first direction.

In an embodiment, a tubular system includes a first tubular having a recess formed at a pin end. The system also includes a second tubular having a box end, the pin end mating with the box end and joining the first tubular to the second tubular via respective threads. The system further includes an anti-rotation system configured to block rotation of the first tubular and the second tubular in a first direction that disengages the respective threads. The anti-rotation system includes a key arranged within the recess, the key having teeth along a lower edge. The anti-rotation system further includes a retention fastener, extending through an aperture of the key, coupling the key to the first tubular. The anti-rotation system also includes an installation fastener coupling the key to the first tubular, the installation fastener engaging a tapered receptacle of the key. The key is transitioned between a shipping configuration and an engaged configuration via engagement, by the installation fastener, exceeding a threshold amount, the engaged position driving rotation of the key about the retention fastener and, in response to rotation in the first direction corresponding to a breakout condition, drives the teeth into the second tubular.

In an embodiment, a method for blocking rotation of a first tubular includes positioning a key within a recess of the first tubular. The method also includes securing the key within the recess via a retention fastener. The method further includes securing the key within the recess via an installation fastener, the installation fastener being installed at a first position less than a threshold. The method also includes engaging a box end of a second tubular with a pin end of the first tubular. The method further includes transitioning the installation fastener to a second position that exceeds the threshold.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present disclosure are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Moreover, like reference numerals may be used for like items throughout the specification, however, such usage is for convenience and is not intended to limit the scope of the present disclosure.

Embodiments of the present disclosure are directed toward an anti-rotation key for use with threaded fittings, such as those used in oil and gas production and exploration. The anti-rotation key may be configured to not utilize on-rig installation, and in contrast, be installed prior to shipping and/or prior to delivery. As a result, embodiments may reduce the presence of loose parts, installation tooling, clocking of pin/box during manufacturing, and the like. Reducing the loose parts and simplifying installation processes may reduce time on rig and associated operation costs.

Various embodiments of the present disclosure include an anti-rotation key that may be installed in a pin of a box and pin connector in-house, prior to delivery. As a result, there may be no and/or limited personnel interaction on the rig with little to no associated risks related to misalignment and/or clocking since embodiments include a single interfacing part. The installation force utilized to set the key also comes from the connection itself upon accidental back-out. Such a configuration may be utilized with current industry trends for automation to remove personnel from various locations at a well site. As a result, configurations may enable components that are fit-for-service upon installation of the pin/box connection on the rig, either via a spring interaction or a single bolt tightening.

Embodiments of the present disclosure prevent inadvertent rotation of threaded components, blocking and/or reducing the risk of rotation in a direction (e.g., a direction that would loosen the connection between the components). Furthermore, embodiments remove the clocking risk associated with current anti-rotation keys. Additionally, installation and operation does not provide significant axial loading, making embodiments suitable for fatigue operations.

Various embodiments provide a multi-step setting and resisting process in order to resist rotation of piping components while also reducing detrimental axial fatigue applied to a connection between tubular components. Furthermore, embodiments overcome problems with present systems related to clocking of the pin and box members, which is also known as the relative angular orientation between fittings. The multi-step process includes installing a key for use in an operational environment. For example, the key may be installed such that at least one fastener is partially made up or installed such that the key does not interact with or interfere with a box end of a connection. In a second part of the process, the fastener is made up to engage the key. Such engagement drives at least a portion of the key in a downward direction (e.g., toward the box), thereby driving a pivoting movement of an opposite end of the key about a rotational axis. In various embodiments, an interference between a shoulder and the portion of the key may transmit an axial force to a series of teeth to engage the box. In various embodiments, these teeth are provided in order to facilitate engagement of a second set of teeth that will resist a rotational load.

Embodiments further include additional steps in response to movement of one of the tubulars in an "unmake" direction, or a direction opposite a thread tightening direction. In response to the rotational movement, the first set of teeth pull the key to drive mating edges along profiled tapers. As a result, a high axial load drives the second set of teeth to engage of the box. Further movement of the key unloads the profiled taper, which reduces or removes the axial load, while still resisting circumferential forces. As a result, the key resists high levels of rotational force without producing a high level of axial load.

Various embodiments include an anti-rotation system including a key fitted within a recess, for example a recess formed within a pin end of a box and pin connector. The key may be secured via a retention fastener, such as a bolt, that provides a location for rotation and/or movement of the key within the recess. The key is further engaged by an installation fastener, such as a bolt, that is utilized to preload or prepare the key for operation. For example, the installation fastener may bear against at least a portion of the key, such as at an end associated with a tapered surface, to drive an opposite end of the key against a shoulder of the recess. In response to the loading applied by the installation fastener, one or more teeth of the key engage the box. In certain embodiments, an initial set of teeth engage the box, and then in response to rotation, an additional set of teeth may engage the box. For example, as break out begins, the key may shift or otherwise rotate within the recess, where at least one edge may contact a mating shoulder of the recess, which may induce a force in the key to drive additional teeth into the box. The teeth may engage the box to prevent further rotation of the pin while unloading the axial force.

Figure 1:
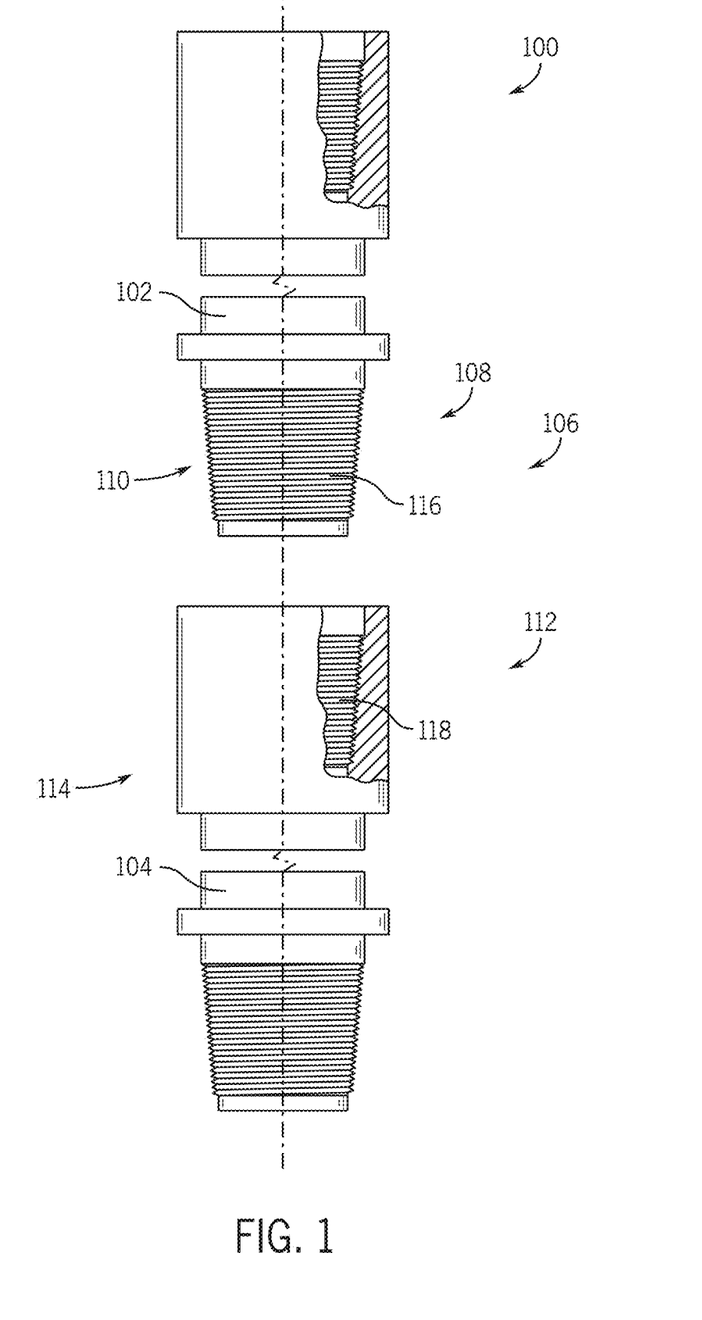
FIG. 1 is a schematic side view of an embodiment of a tubular connection system, in accordance with embodiments of the present disclosure.

FIG. 1 is a side view of an embodiment of a tubular connection system 100 including a first tubular 102 (e.g., upper tubular, uphole tubular, etc.) and a second tubular 104 (e.g., lower tubular, downhole tubular, etc.). The first and second tubulars 102, 104 are coupled together via a box and pin connector 106, where a pin 108 (e.g., pin end) is formed at a lower region 110 of the first tubular 102 and a box 112

(e.g., box end) is formed at an upper region 114 of the second tubular 104. In operation, the pin 108 is installed within the box 112 and rotated so that the respective threads 116, 118 engage, thereby securing the first tubular 102 to the second tubular 104. It should be appreciated that various components of the first and second tubulars 102, 104 have been omitted for clarity and conciseness and that various components, their general appearance, and the like may be modified and still be utilized with embodiments of the present disclosure.

In operation, the first tubular 102 is coupled to the second tubular 104, and so on, until a string is formed having a desired length. This string may be installed into a wellbore, for example as a casing or production string. Running the string into the wellbore may expose the string to various forces, which may cause rotation of one or more of the tubulars 102, 104. This is undesirable, as a seal along the string may be weakened due to the rotation of the tubulars 102, 104. Embodiments of the present disclosure are directed toward an anti-rotation key that may be arranged at an interface between the pin 108 and the box 112 to block rotation in a first direction (e.g., the direction to decouple the tubulars 102, 104).

It should be appreciated that, in various embodiments, tubulars that include traditional anti-rotation keys may be utilized with a particular orientation to enable the key and a mating receptacle to align. Furthermore, to accommodate angular orientations (for example, due to bends), clocking of the tubulars may dictate how piping is coupled. These adjustments may be time intensive and, in various embodiments, complicate operations at the wellbore. Embodiments of the present disclosure may eliminate this problem by utilizing an anti-rotation key that can engage any portion of a box end, thereby eliminating alignments with particular portions of the box.

Figure 2:
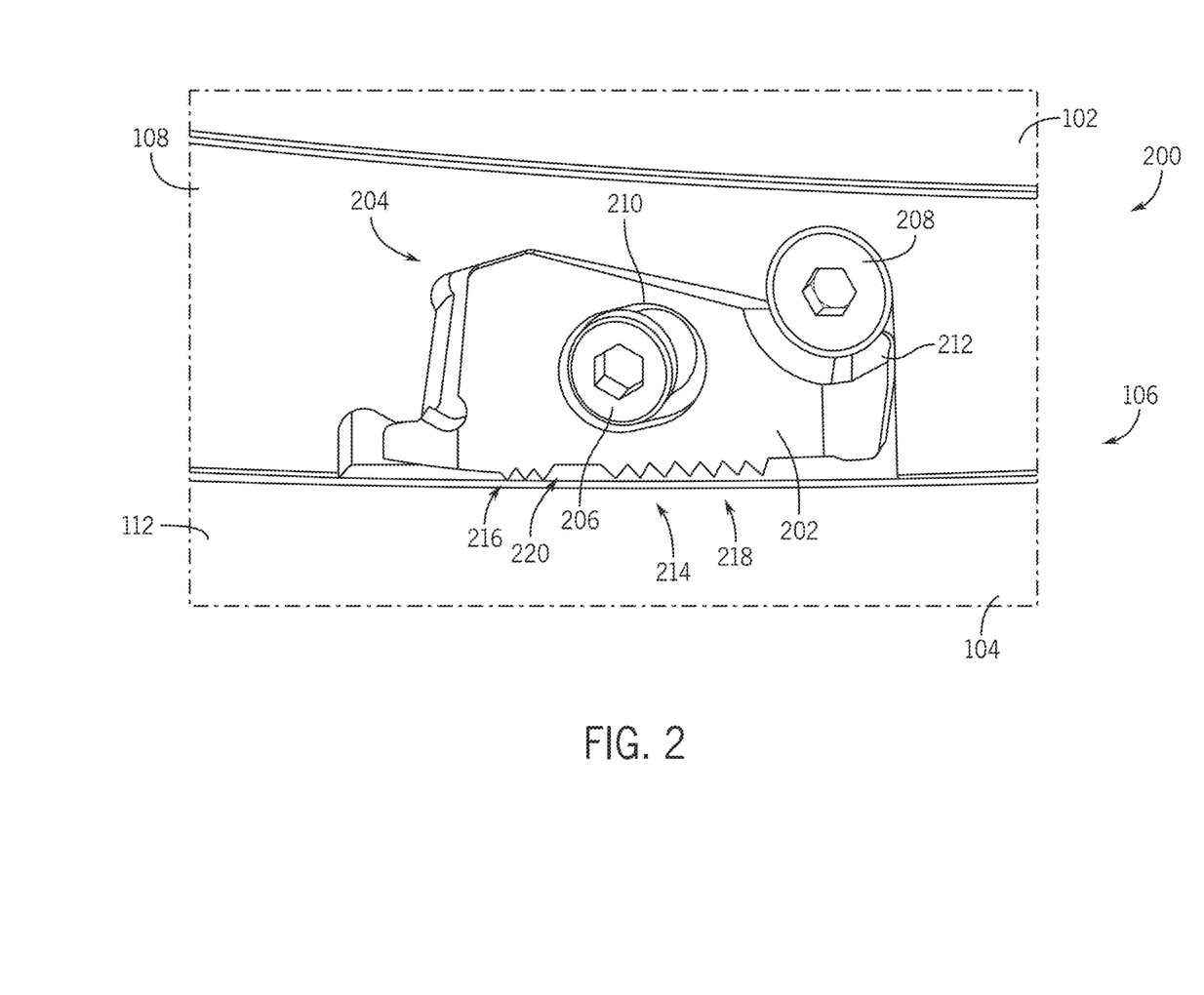
FIG. 2 is a schematic view of an embodiment of an anti-rotation system, in accordance with embodiments of the present disclosure.

FIG. 2 is a schematic perspective view of an embodiment of the box and pin connector 106 includes an anti-rotation system 200. In various embodiments of the present disclosure, the anti-rotation system 200 is illustrated as being arranged on the first tubular 102 (e.g., at the pin end 108). However, it should be appreciated that embodiments may arrange the anti-rotation system 200 on the second tubular 104 (e.g., at the box end 112). The illustrated anti-rotation system 200 includes a key 202 (e.g., anti-rotation key) that is arranged within a recess 204 formed within the first tubular 102. The recess may be machined in an area of the first tubular 104 that includes an increased outer diameter, thereby providing sufficient pressure control capabilities. The key 202 is coupled to the first tubular 102 via a retention fastener 206 (e.g., retention bolt) and an installation fastener 208 (e.g., installation bolt). It should be appreciated that bolts are only used as illustrated fasteners that may be utilized in embodiments of the present disclosure, but it should be not interpreted as limiting the disclosure to only using bolts.

The illustrated key 202 includes an elongated aperture 210 that receives the retention fastener 206. As shown, the elongated aperture 210 is larger than a shaft (not pictured) of the retention fastener 206, and as will be described below, facilitates movement of the key 202 within the recess 204. The key 202 further includes a tapered receptacle 212, which is engaged by the installation fastener 208. The tapered receptacle 212 includes a slanted or sloped face that is engaged by a mating tapered face of the installation fastener 208, as will be described in detail below. For example, installation fastener 208 may be installed to a set torque that drives an interaction with the key 202. As the installation fastener 208 is driven in, the key is driven down to drive teeth into the box 112.

The key 202 further includes teeth 214, which may be designated as first teeth 216 (e.g., engaging teeth) and second teeth 218 (e.g., anti-rotation teeth). As shown, the first teeth 216 are smaller than the second teeth 218 and are separated from the second teeth 218 via a gap 220. In operation, the first teeth 216 engage the box 112 prior to the second teeth 218. That is, the first teeth 216 may cut into the box 112 in an initial setting phase and then the second teeth 218 are utilized to resist rotation. In various embodiments, the first teeth 216 engage the box 112 prior to the second teeth 218. In response to rotation of the pin 108, the key 202 may move within the recess 204, at least in part due to the engagement of the first teeth 216. A resultant axial force is then applied that drives the second teeth 218 into the box 112. As the key 202 continues to move, the axial force may de-load from the key 202, thereby reducing axial loads at the connection while still maintaining strong resistance to rotation. Moreover, it should be appreciated that the key 202 is arranged to engage the box 112 without clocking to align to a particular location. That is, the key 202 may be utilized at any reasonable location around the circumference of the box 112.

Operation of the anti-rotation system 200 will be described herein in more detail. The key 202 includes various features to facilitate movement along mating edges with the pin 108. As the key is driven along the edges, for example due at least in part to the engagement of the first teeth 216, an axial pre-load may be applied, driving the first teeth 216 into the box 112 and further driving the second teeth 218 into the box. However, as the key 202 continues to move within the recess 204 (or as the recess 204 moves around the key 202), the key 202 may shift or otherwise pivot about the retention fastener 206. This shift may drive the second teeth 218 into the box 112, which will then resist rotation. In other words, operation of the key 202 may be described as occurring in at least two phases. In a first phase, an axial setting occurs to facilitate engagement between the key 202 and the box 112. In a second phase, the axial setting force is relieved and the anti-rotation features are accomplished via the second teeth 218.

Various embodiments of the present disclosure may include a dual shoulder loading system for driving and then for breakout. For example, a first shoulder may apply a rotational force to drive the teeth into the box while a second shoulder provides an additional force to maintain contact between the teeth and the box in response to rotational movement of the pin. Embodiments further include an extension or bumps to apply a key setting load upon installation of the installation fastener. Upon setting, the first set of teeth may drive movement of the key along mating edges to axially load the second set of teeth in response to a break out force. Furthermore, embodiments may include a positive stop shoulder to prevent over penetration of the teeth.

Figure 3:
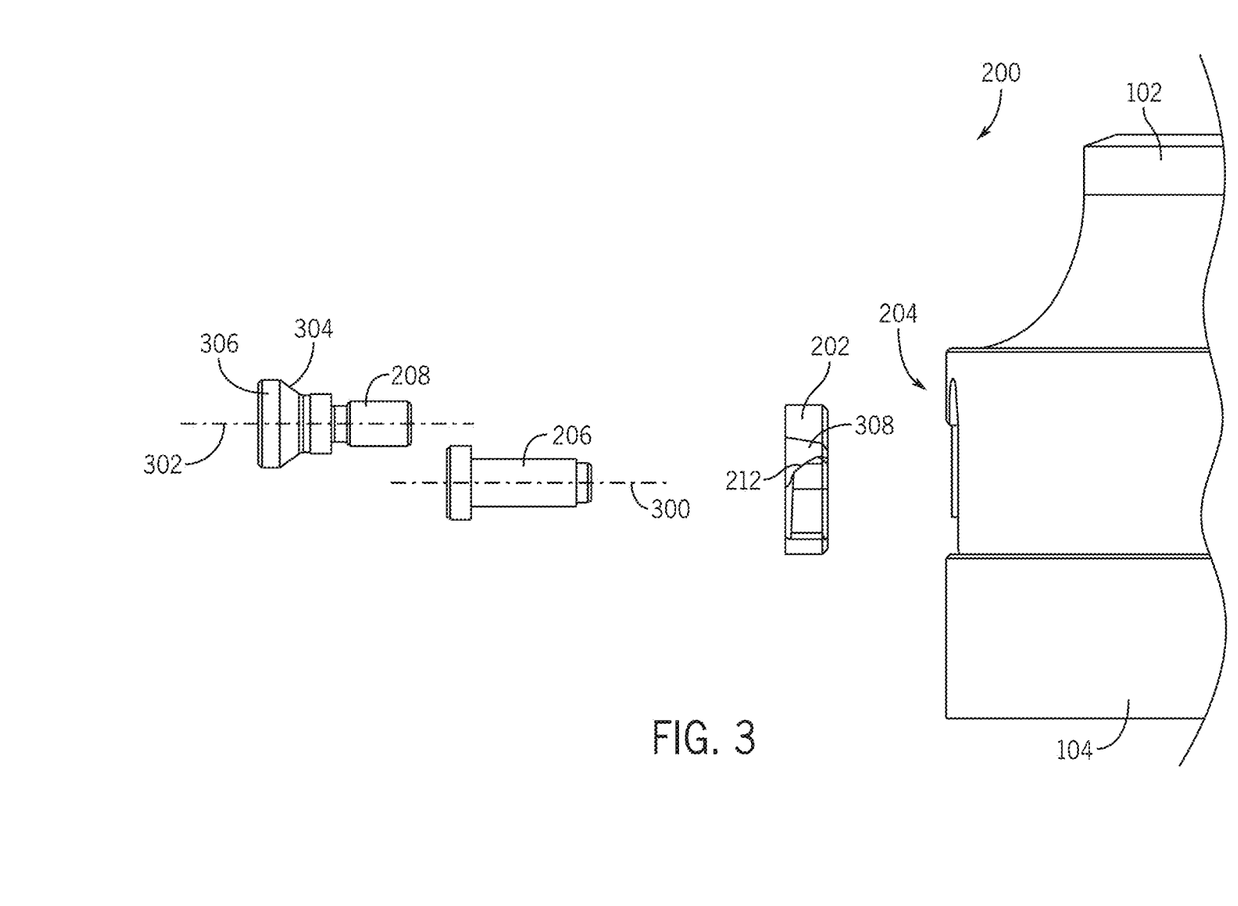
FIG. 3 is an exploded view of an embodiment of an anti-rotation system, in accordance with embodiments of the present disclosure.

FIG. 3 is an exploded side view of an embodiment of the anti-rotation system 200 in which the key 202 is illustrated proximate the recess 204. Both the retention fastener 206 and the installation fastener 208 are illustrated as being at differential axial heights. That is, a retention axis 300 is axially lower than an installation axis 302. Furthermore, each of the retention fastener 206 and the installation fastener 208 are mounted to separate, independent locations, as illustrated by their positions in FIG. 2 and FIG. 3. Accordingly, each of the fasteners 206, 208 may be independently engageable/rotatable. In other words, the retention fastener 206 may be fully installed (e.g., installed to a predetermined position) while the installation fastener 208 may be partially installed (e.g., installed to a first position) prior to being fully installed (e.g., installed to a second position). As noted above, the installation fastener 208 includes a tapered face 304 along a head 306. This tapered face 304 is positioned to contact the tapered receptacle 212 of the key 202, which includes a sloped or tapered mating face 308.

In operation, an installation position of the installation fastener 208 may, at least in part, determine operating parameters of the anti-rotation system 200. For example, the installation fastener 208 may be installed in at least two different configurations, as will be described below. In a first configuration, which may be referred to as a shipping configuration or storage configuration, the installation fastener 208 is installed such that the installation fastener 208 is below a threshold torque or radial position with respect to the first tubular 102. For example, the installation fastener 208 may be installed such that threads engage mating threads in the first tubular 102, but such that the tapered face 304 does not contact the mating face 308. However, in various embodiments, the installation fastener 208 may be installed such that the threads engage mating threads in the first tubular 102 and the tapered face 304 contacts the mating face 308, however, such contact is insufficient to apply a torque past a predetermined location on the key 202. It should be appreciated that this position may be particularly selected based at least in part on design conditions.

In a second configuration, which may be referred to as an installed configuration or activated configuration, the installation fastener 208 may be driven such to a second torque or radial position with respect to the first tubular 102. As a result, contact between the tapered face 304 and the mating face 308 may drive rotation of the key 202 about the retention axis 300, which may pre-load the first teeth 216.

Figure 4A:
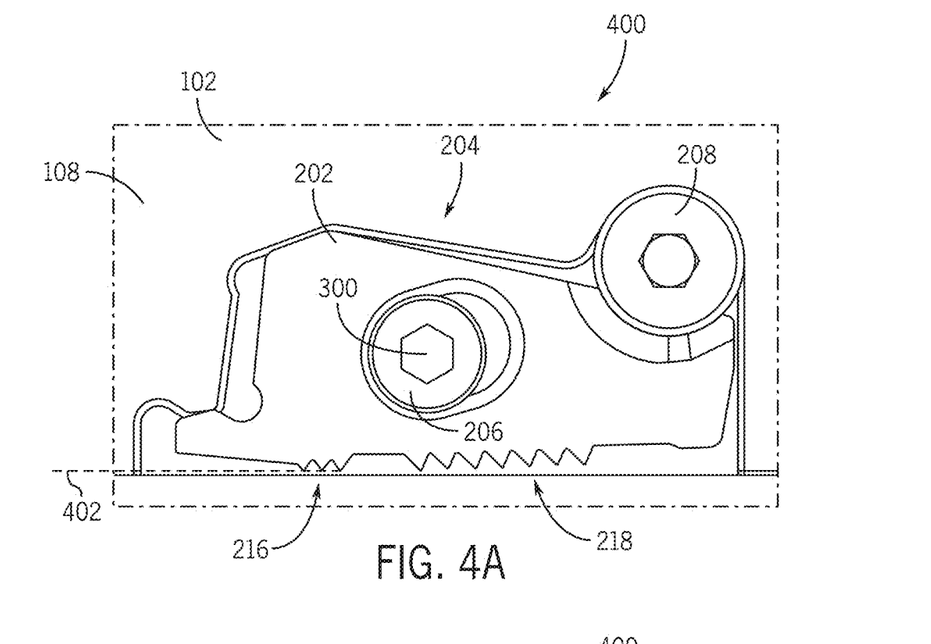
FIGS. 4A and 4B are schematic views of an embodiment of an anti-rotation system in a shipping configuration, in accordance with embodiments of the present disclosure.

FIGS. 4A and 4B are front views of the key 202. In the embodiment of FIG. 4A, the key 202 is arranged in a shipping or pre-installed configuration 400 in which a torque setting of the installation fastener 208 does not drive movement of the key 202. In this state, the installation fastener 208 is installed but not in its final position, thereby allowing movement of the key 202 within the recess 204. This allows the pin 108 and components of the anti-rotation system 200 to be shipped as one piece, with no separate loose parts. As illustrated, the key 202 fits loosely in the recess 204, free to rotate around the retention fastener 206 until one of the other surfaces contact. The key 202 will move up into the slot if a protector or box 112 is installed.

Figure 4B:
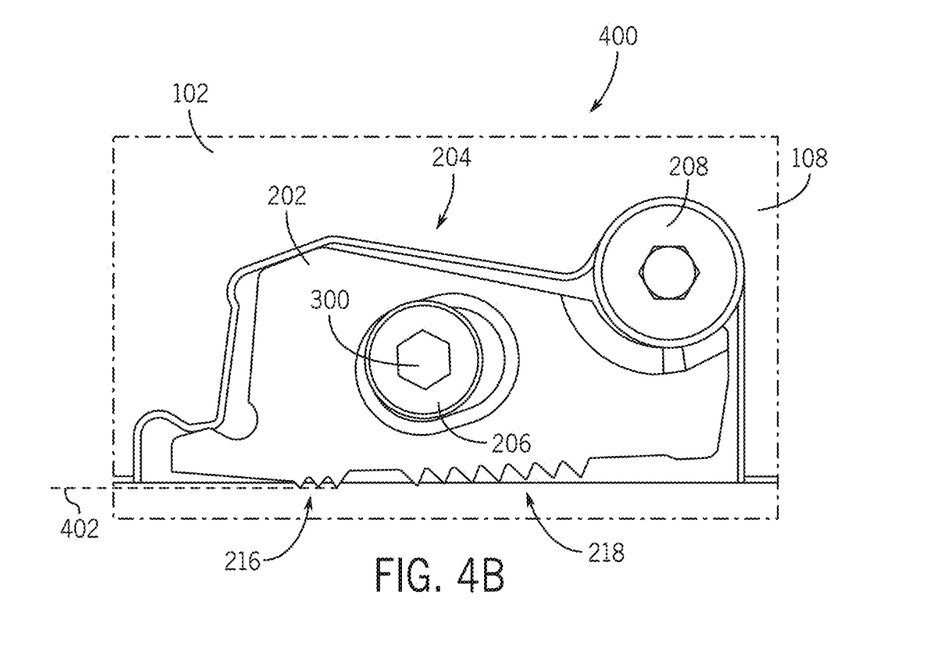

FIG. 4B illustrates the key 202 after the installation fastener 208 is engaged, as will be described in more detail below. As illustrated between FIGS. 4A and 4B, the key 202 rotates about the retention axis 300, for example, to adjust a position of the teeth 214. That is, a longitudinal location 402 of the first teeth 216 is higher in FIG. 4A than in FIG. 4B. This may serve as a pre-load to enable the first teeth 216 to engage the box (not pictured), which enables movement of the key 202 along the recess 204 to drive the second teeth 218 into the box.

As noted above, the components are secured to the first tubular 102 to enable secure transportation and/or movement. Advantageously, the anti-rotation system 200 may be delivered to the site without loose or uncoupled fittings or components. As a result, installation may be simplified, as an operator may make up the first tubular 102 to the second tubular 104 and then engage the installation fastener 208. Because the key 202 is configured to engage the box 112 at any location, and not a predetermined location like prior art systems, installation is simplified because any installation configuration that mates the threads 116, 118 may be appropriate for use with the anti-rotation system 200. This may eliminate difficult and time consuming clocking for the tubulars, thereby improving installation procedures.

Figure 4C:
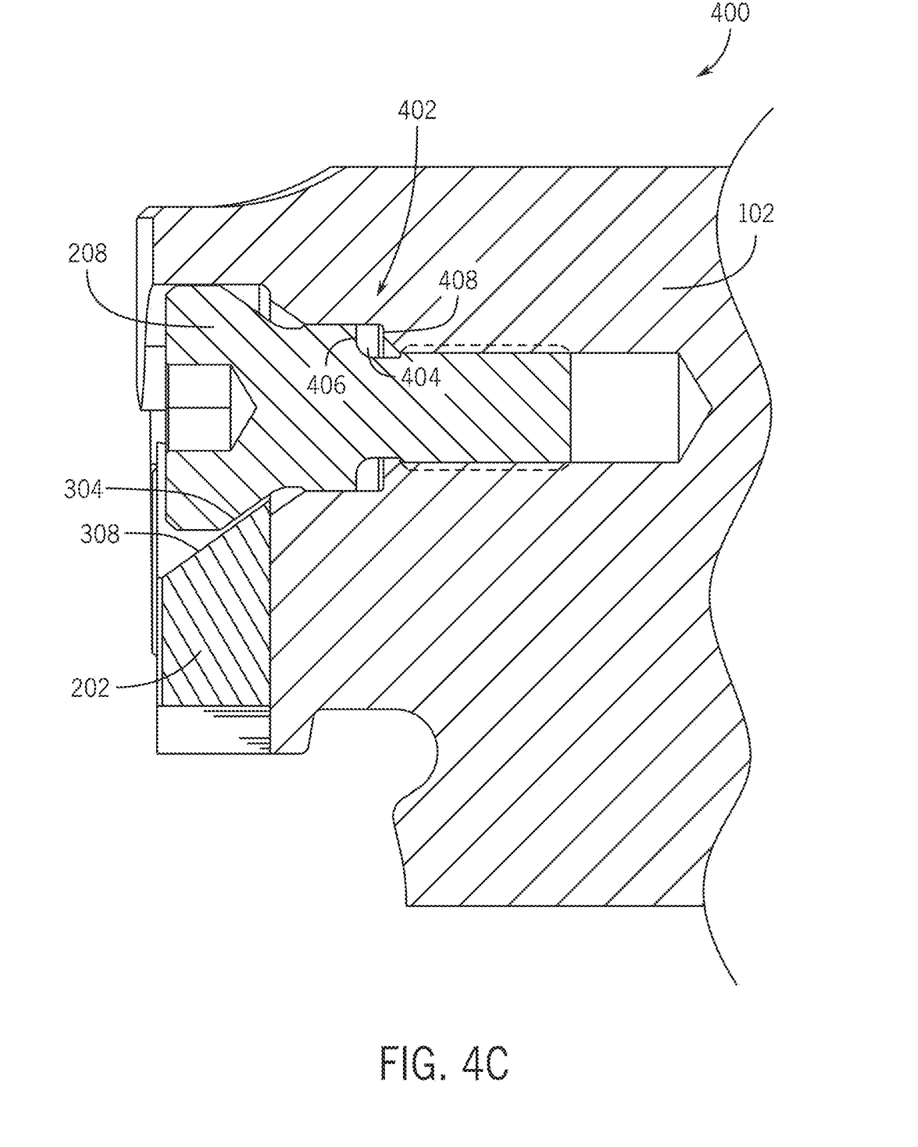
FIG. 4C is a cross-sectional side view of an embodiment of an anti-rotation system in a shipping configuration, in accordance with embodiments of the present disclosure.

FIG. 4C is a cross-sectional view of an embodiment of the installation fastener 208 in the shipping or pre-installed configuration 400. As illustrated, a gap 404 is arranged between a fastener stop 406 and a reception shoulder 408. There is limited and/or no contact between the tapered face 304 and the mating face 308, however, threads of the installation fastener 208 are engaged with the first tubular 102, thereby securing the installation fastener 208 in position.

Figure 5A:
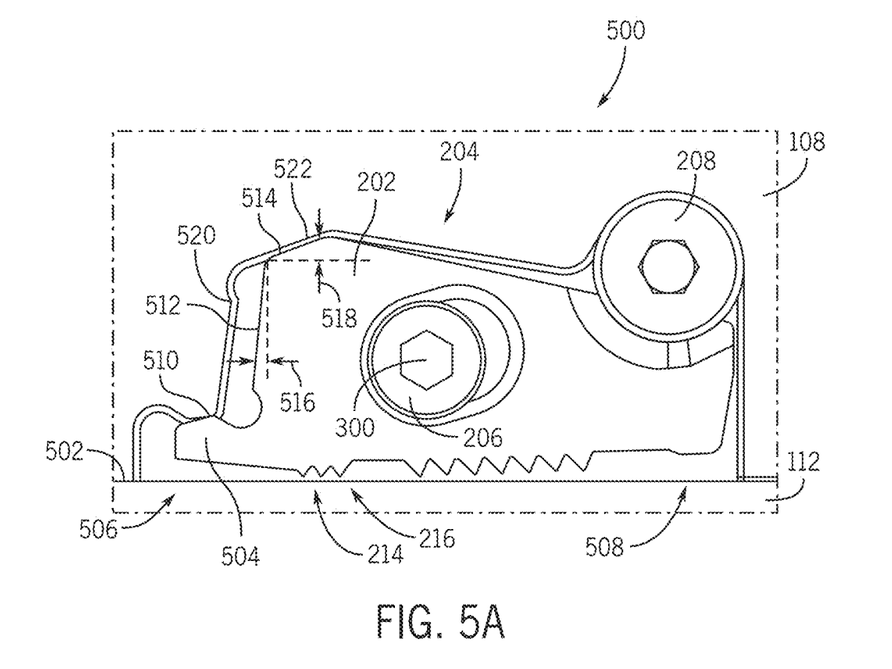
FIGS. 5A and 5B are schematic views of an embodiment of an anti-rotation system, in accordance with embodiments of the present disclosure.
Figure 5B:
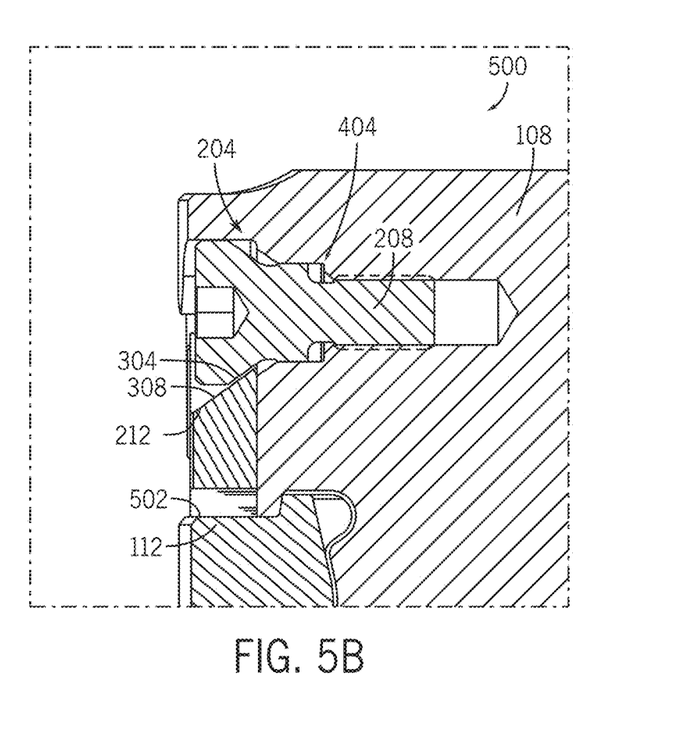

FIGS. 5A and 5B. illustrate the anti-rotation system 200 in a configuration 500 where the box 112 is mated to the pin 108. As previously described, the key 202 is arranged within the recess 204 formed in the pin 108, and as a result, there is no mating feature formed or machined into the box 112. Accordingly, previous clocking methods may not be needed to utilize embodiments of the present disclosure because the teeth 214 directly engage the box 112 and may engage the box 112 at any reasonable location. The illustrated key 202 is still positioned in a shipping configuration, such as the configuration of FIGS. 4A-4C, as illustrated in the cross-sectional view of FIG. 5B, where the tapered face 304 partially engages the tapered receptacle 212 and the gap 404 remains. As will be described below, further torqueing or engagement of the installation fastener 208 may facilitate full engagement of the tapered receptacle 212.

In the illustrated embodiment, the teeth 214, or at least a portion thereof, may engage the box 112, but there is no active axial force illustrated as driving the teeth 214 into the box because of the positioning in the shipping configuration. For example, the first set 216 are positioned against a shoulder 502 of the box. The illustrated configuration 500 may be a result of engaging the box and pin connector 106 prior to engagement of the anti-rotation system 200. However, it should be appreciated that, in other embodiments, engagement of the anti-rotation system 200 may be driven, at least partially, by engagement of the box and pin connector 106. By way of example only, a resilient feature, such as a spring, may engage the key 202 upon connection between the pin 108 and the box 112.

As described above, the key 202 includes a variety of features and edges to facilitate engagement of various mating aspects of the recess 204. For example, in the illustrated embodiment, the key 202 includes an extension 504 (e.g., flexible bump) at a first end 506 opposite a second end 508 that includes the tapered receptacle 212. As illustrated, the extension 504 may contact a recess shoulder 510. Forces between the shoulder 510 and the extension 504 may drive movement of the key 202 about the retention axis 300. For example, an upward force (from the key 202) at the shoulder 510 would be responsive to a downward force (from the installation fastener 208) at the second end 508.

Furthermore, force transfers between the key 202 and the recess 204 may also occur along interactions between first and second sloped areas/shoulders between the key and the recess. It should be appreciated that components may be referred to as "first" or "second" but that these labels are for clarity and illustrative purposes only. An upper region of the key/recess area may include a first sloped area 514 arranged at a first angle 518. The first sloped area 514 engages a first sloped shoulder 522 of the recess 204. A lower or vertical region of the key/recess area may include a second sloped area 512 arranged at a second angle 516. The second sloped area 512 engages a second sloped shoulder 520. It should be appreciated that the illustrated embodiment includes different angles 516, 518, but in various other embodiments the angles 516, 518 may be substantially equal or any other reasonable size. The respective sloped areas 514, 512 may engage the sloped shoulders 522, 520 (e.g., tapers, shallow tapers) during movement of the key 202. For example, in response to rotation and/or engagement via the installation fastener 208. As will be described below, movement of the pin 108 and/or box 112 in a first direction may drive the teeth into the box 112, thereby blocking further rotation.

As described above, FIG. 5B illustrates a cross-sectional view where the key 202 is not fully engaged by the installation fastener 208. As a result, the gap 404 is still illustrated. In various embodiments, the tapered face 304 and the mating face 308 may be at least partially engaged, but the engagement may be less than a threshold amount in the illustrated embodiment.

Figure 6A:
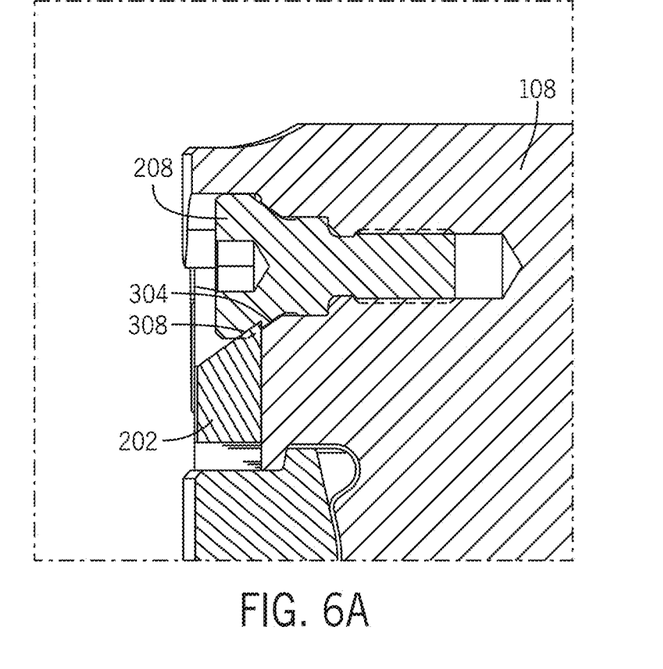
FIG. 6A is a cross-sectional side view of an embodiment of an anti-rotation system in an engaged configuration, in accordance with embodiments of the present disclosure.
Figure 6B:
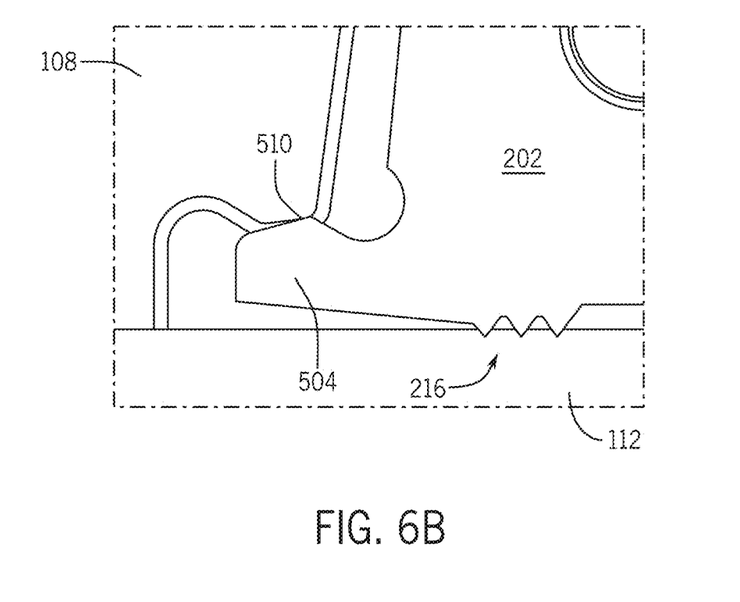
FIG. 6B is a detailed schematic side view of an embodiment of an anti-rotation system in an engaged configuration, in accordance with embodiments of the present disclosure.
Figure 6C:
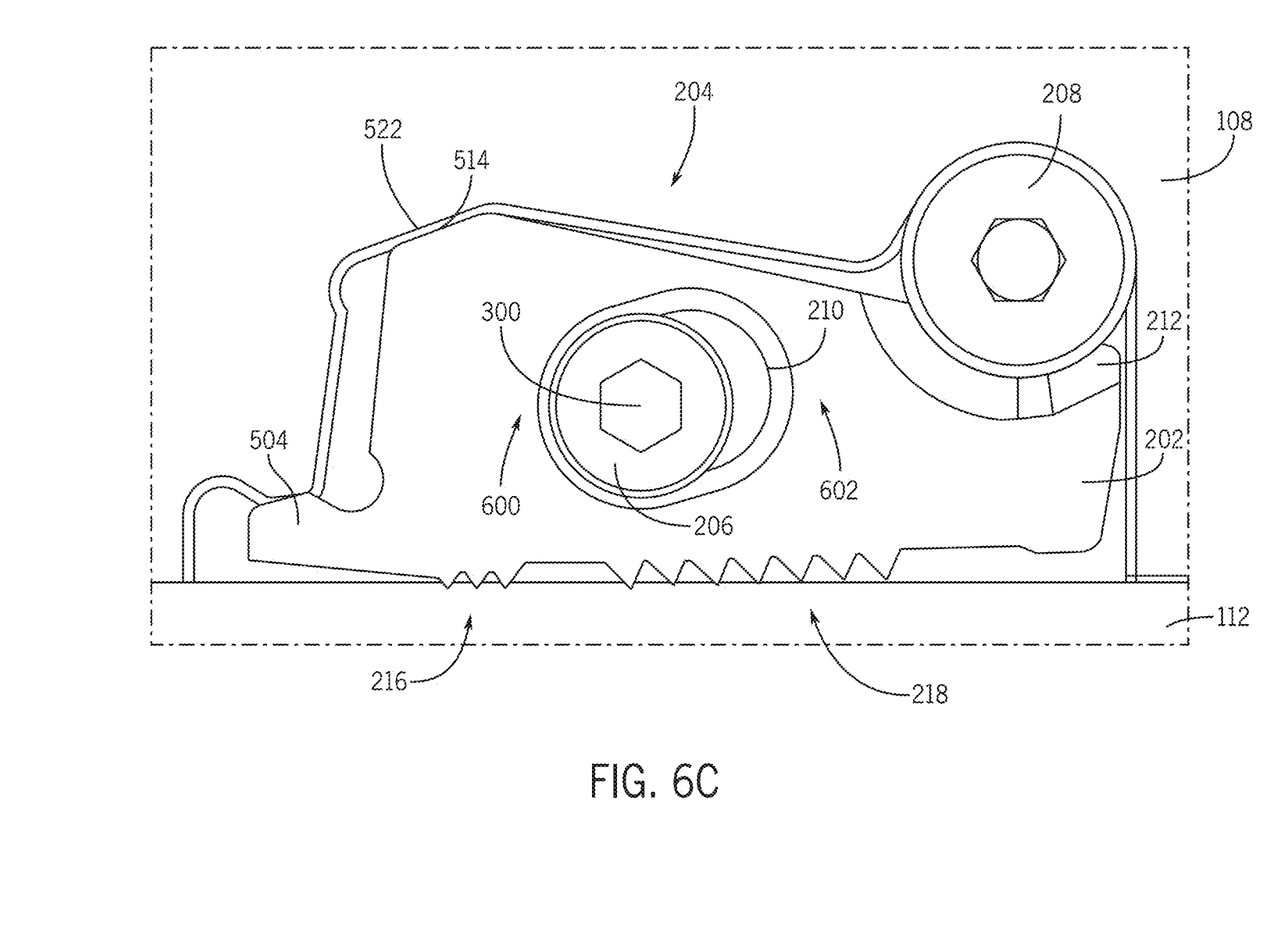
FIG. 6C is schematic front view of an embodiment of an anti-rotation system in an engaged configuration, in accordance with embodiments of the present disclosure.

FIGS. 6A-6C illustrate full engagement of the key 202 via the installation fastener 208, and the resulting force at the extension 504. FIG. 6A is a cross-sectional view of the anti-rotation system 200 where the installation fastener 208 is driven into engagement with the tapered receptacle 212 such that the tapered face 304 applies a force to the mating face 308 that exceeds a threshold amount to transition from the shipping or transport configuration shown in FIGS. 4A-4C. As shown, the tapered face 304 bears against the tapered receptacle 212 as the installation fastener 208 is driven into the pin 108 and the gap 404 is eliminated or substantially eliminated.

FIG. 6B is a front view illustrating a resultant contact between the key 202 and the recess shoulder 510, specifically contact at the extension 504. Moreover, the first set of teeth 216 move into engagement with the box 112 and dig into the box 112. As noted above, the force applied to the tapered receptacle 212 drives rotation of the key 202 about the retention axis 300, which drives the extension 504 into the recess shoulder 510. This movement also drives the first set of teeth 216 into the box 112, thereby applying an axial load at the joint. As will be described below, this load may be released upon movement of the key 202.

FIG. 6C is a side view illustrating the key 202 after the installation fastener 208 is moved to fully engage the tapered receptacle 212, which may also be referred to as an engaged position. As shown, the extension 504 contacts the recess shoulder 510 and the first set of teeth 216 engage the box 112. Moreover, the retention bolt 206 is positioned at a first edge 600 of the elongated aperture 210 while a second edge 602 remains unengaged. The first sloped area 514 is also substantially aligned with the first sloped shoulder 522, and in various embodiments, may contact the first sloped shoulder 522. As a result, the key 202 is in an engaged position to resist rotation of the box and pin connector 106. That is, rotation may drive movement of the pin 108, relative to the box 112, in a direction that breaks apart the threads 116, 118.

Figure 7A:
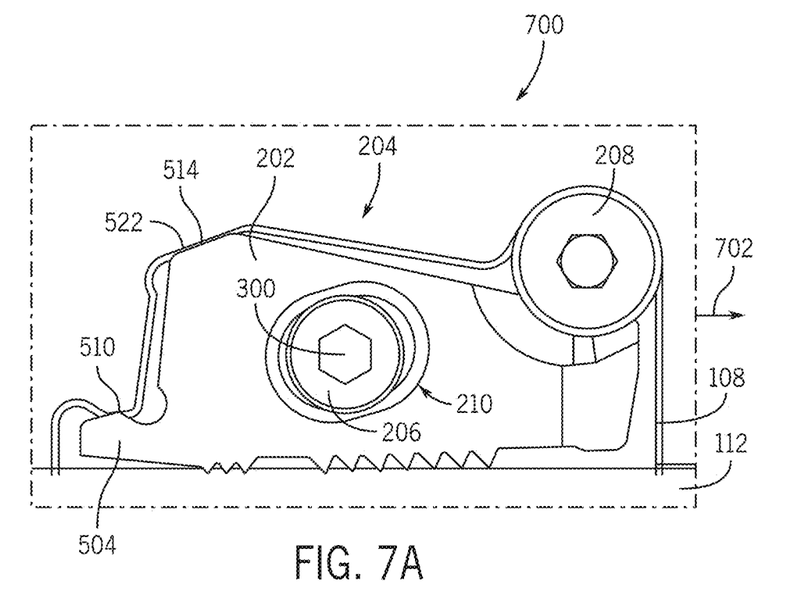
FIGS. 7A and 7B are schematic front views of an embodiment of an anti-rotation system in a breakout configuration, in accordance with embodiments of the present disclosure.
Figure 7B:
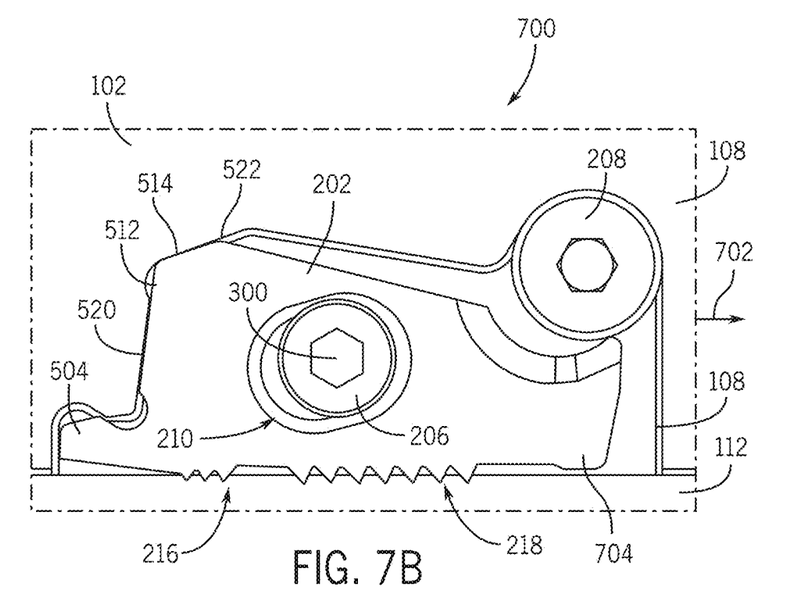

FIGS. 7A and 7B illustrate a breakout condition 700 where the pin 108 and/or box 112 move in a first direction 702 relative to the box 112 and/or pin 108. This movement may be in a direction that disengages the threads 116, 118, thereby breaking the connection between the pin 108 and the box 112. In the illustrated embodiment of FIG. 7A, the key 202 is in the engaged position such that the extension 504 contacts the recess shoulder 510 and the first set of teeth 216 engage the box 112. As illustrated, the pin 108 is rotated in the first direction 702, which may be a direction opposite engagement of the threads 116, 118. In response to movement of the pin 108, the first sloped area 514 moves along the first sloped shoulder 522. This movement of the pin 108 causes the retention bolt 210 to also move in the first direction 702, thereby changing its position within the elongated aperture 210. When compared to the position of FIG. 6C, it is shown that FIG. 7A has caused a shift with the relative positon of the key 202 within the recess 204.

The contact between the first sloped area 514 and the first sloped shoulder 522 may apply a force to the second end 508, which may drive rotation about the retention axis 300 to bring the second teeth 218 into contact with the box 112. As a result, the second teeth 218 may dig into the box 112, thereby providing anti-rotation protection, as will be described below. It should be appreciated that an axial force is utilized to drive the second teeth 218 into the box 112. As noted above, the axial force may be undesirable due to fatigue, and accordingly, embodiments may provide for a relief of the axial force, as will be described below.

FIGS. 7A and 7B illustrate continued movement such that the first sloped area 514 continues to slide along the first sloped shoulder 522. As a result, a force is applied to the key 202, which rotates the key 202 about the retention axis 300, thereby driving the second set of teeth 218 into the box 112, as noted above. Continued movement brings the second sloped area 512 into contact with the second sloped shoulder 520. Torque build up results in the key 202 loading up against the shoulder 520 and unloading the shallow tapered surface (e.g., the first sloped shoulder 522). This changes the loading on the key 202 from being highly axial to highly circumferential. And, because the teeth 218 have already been set, axial load is no longer needed or desired. Therefore, the key 202 may now resist a high level of torque without producing a high level of axial load.

As illustrated, the retention fastener 206 has shifted within the elongated aperture 210, when compared to FIG. 7A, illustrating that the key 202 is now in an anti-rotation position where rotation in the first direction 702 is resisted due to the force of the second set of teeth 218. In various embodiments, such as the configuration of FIG. 7B, the tapered receptacle 212 may shift away from the installation fastener 208. However, it should be appreciated that other embodiments may maintain contact between the tapered receptacle 212 and the installation fastener 208. Accordingly, embodiments of the present disclosure may be utilized to block break out or rotation of the pin 108 and/or box 112 in a manner that breaks the coupling between the threads 116, 118.

FIG. 7B further illustrates a stop shoulder 704 at the second end 508. The stop shoulder 704 may, in response to rotation about the retention bolt 206, move into contact with the box 112, thereby preventing over-penetration of the teeth 214. For example, penetration of the teeth 214 may be preferentially kept within a range, such as approximately 60 percent. However, there may be more or less penetration, as designated by design conditions. The stop shoulder 704 may block further rotation as the second sloped area 512 moves into engagement with the second sloped shoulder 520.

Figure 8:
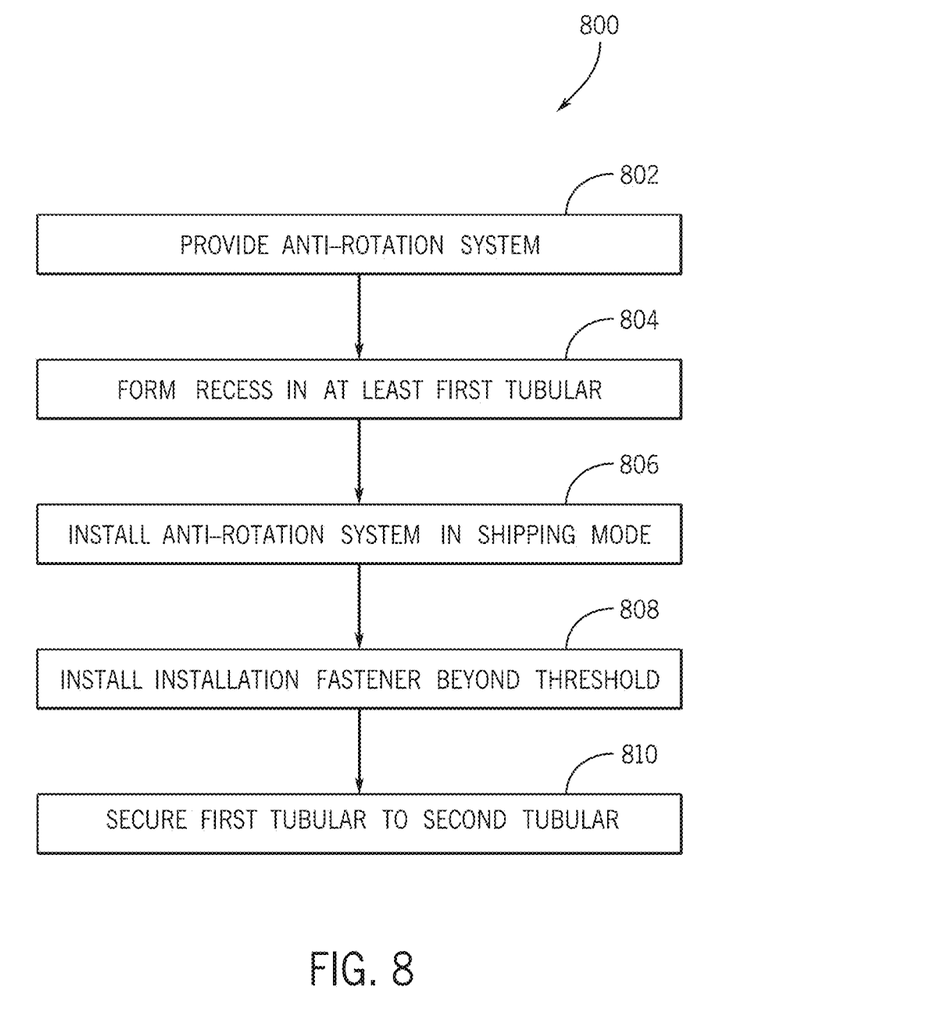
FIG. 8 is a flow chart of an embodiment of a method for installing an anti-rotation system, in accordance with embodiments of the present disclosure.

FIG. 8 is a flow chart for a method 800 of blocking or preventing break out between wellbore components. It should be appreciated that this method, and all methods described herein, may include more or fewer steps, and also that the steps may be performed in a different order, or in parallel, unless otherwise specifically stated. This example begins with providing an anti-rotation system 802. For example, the anti-rotation system described herein may be provided as a kit or otherwise as an offering for use in oil and gas operations. A recess may be formed in a first tubular 804.

For example, a recess, similar to the recess 204 described herein, may be formed to accommodate the anti-rotation system. Advantageously, the recess 204 may be formed on only one end of the tubular without accounting for a mating region because the anti-rotation system may be utilized to directly engage the box 112 at any location along a rim. In various embodiments, the tubular may be specifically formed in order to accommodate the anti-rotation system.

The anti-rotation system may be installed in a shipping mode 806. As described above, the retention fastener may be utilized to secure the key to the tubular while the installation fastener may be partially installed such that loose parts are not associated with the anti-rotation system. In various embodiments, the first tubular is secured to a second tubular 808. For example, a pin end of the first tubular may be threaded into a box end of the second tubular. Thereafter, the installation fastener may be installed beyond a threshold 810, which activates the anti-rotation system. For example, the installation fastener may be installed such that the tapered face 304 engages the tapered receptacle 212 to drive the first set of teeth 216 toward the box. As noted above, when the connection between the first tubular and the second tubular begins to break, the anti-rotation system may engage the second set of teeth to block rotation of the first tubular relative the second tubular, thereby maintaining the connection between the components.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for blocking rotation between a first tubular and a second tubular, comprising:
   a key positioned within a recess formed in the first tubular, the first tubular arranged uphole of the second tubular;
   a retention fastener securing the key to the first tubular, the retention fastener being arranged within an elongated aperture extending through the key;
   an installation fastener moving the key from a storage configuration when in a first position to an engaged configuration when in a second position, the installation fastener having a tapered face that engages at least a portion of the key; and
   teeth arranged along a bottom portion of the key, proximate the second tubular, the teeth engaging the second tubular via rotation of the key about the retention fastener and blocking rotation of the first tubular relative to the second tubular in a first direction.

2. The system of claim 1, wherein the key shifts within the recess when moving between the storage configuration and the engaged configuration, the shift moving the retention fastener from a first edge of the elongated aperture to a second edge of the elongated aperture.

3. The system of claim 1, wherein the key further comprises:
   a first sloped area arranged at a first angle, the first sloped area engaging a first sloped shoulder of the recess in response to movement of the first tubular in the first direction, wherein movement along the first sloped shoulder drives rotation of the teeth into the second tubular.

4. The system of claim 1, wherein the key further comprises:
   an extension arranged at a first end of the key;
   a tapered receptacle arranged at a second end of the key, opposite the first end, the tapered receptacle including a mating face that is engaged by the tapered face of the installation fastener;
   wherein transitioning to the engaged configuration drives rotation of the key about the retention fastener, driving the extension against a shoulder of the recess.

5. The system of claim 1, wherein the teeth comprise:
   a first set of teeth; and
   a second set of teeth, the first set of teeth and second set of teeth separated by a gap;
   wherein the first set of teeth engage the second tubular before the second set of teeth, the first set of teeth driving, at least in part, movement of the key within the recess.

6. The system of claim 1, wherein the retention fastener and the installation fastener are arranged on independent axes at differential axial positions.

7. A tubular system, comprising:
   a first tubular having a recess formed at a pin end;
   a second tubular having a box end, the pin end mating with the box end and joining the first tubular to the second tubular via respective threads;
   an anti-rotation system configured to block rotation of the first tubular and the second tubular in a first direction that disengages the respective threads, the anti-rotation system comprising:
      a key arranged within the recess, the key having teeth along a lower edge;
      a retention fastener, extending through an aperture of the key, coupling the key to the first tubular, wherein the aperture of the key is an elongated aperture; and
      an installation fastener coupling the key to the first tubular, the installation fastener engaging a tapered receptacle of the key;
   wherein the key is transitioned between a shipping configuration and an engaged configuration via engagement, by the installation fastener, exceeding a threshold amount, the engaged position driving rotation of the key about the retention fastener and, in response to rotation in the first direction corresponding to a breakout condition, drives the teeth into the second tubular, and wherein the retention fastener moves from a first edge to a second edge in response to rotation of the first tubular in the first direction.

8. The system of claim 7, wherein the key further comprises:
   an extension arranged at a first end, the extension moving, in response to rotation about the retention fastener, into engagement with a recess shoulder to generate a force to drive the teeth into the second tubular; and
   a stop shoulder, on a second end opposite the first end, the stop shoulder engaging the second tubular to block penetration, by the teeth, beyond a predetermined amount.

9. The system of claim 7, wherein the key further comprises:
   a first sloped area, along a top of the key, positioned to engage a first sloped shoulder of the recess, wherein contact between the first sloped area and the first sloped shoulder generate a reactive force at a second end of the key to drive the teeth into the second tubular; and
   a second sloped area, along a first end of the key, positioned to engage a second sloped shoulder of the recess, wherein contact between the second sloped area and the second sloped shoulder blocks further movement of the key within the recess.

10. The system of claim 7, wherein the installation fastener includes a tapered face that contacts a mating face of the tapered receptacle, the installation fastener being at a first position in the shipping configuration and a second position in the engaged configuration, the second position positioning the installation fastener against a fastener stop formed in the first tubular.

11. The system of claim 7, wherein the teeth further comprise:
   a first set of teeth; and
   a second set of teeth, the first set of teeth and second set of teeth separated by a gap;
   wherein the first set of teeth generate an axial load in response to movement toward the engaged configuration and the second set of teeth bite into the second tubular in response to rotation in the first direction, the rotation relieving the axial load.

12. The system of claim 7, wherein the retention fastener and the installation fastener are arranged on independent axes at differential axial positions.

13. The system of claim 7, wherein the teeth engage an upper region of the second tubular that does not have a mating profile corresponding to the teeth.

14. The system of claim 7, wherein the anti-rotation system is provided pre-installed on the first tubular and is transitioned to the engaged configuration after the first tubular is coupled to the second tubular.

15. A method for blocking rotation of a first tubular, comprising:
   positioning a key within a recess of the first tubular;
   securing the key within the recess via a retention fastener extending through an elongated aperture formed in the key, the elongated aperture to permit movement of the retention fastener from a first edge to a second edge responsive to rotation of the first tubular;
   securing the key within the recess via an installation fastener, the installation fastener being installed at a first position less than a threshold;
   engaging a box end of a second tubular with a pin end of the first tubular; and
   transitioning the installation fastener to a second position that exceeds the threshold; wherein the key rotates about the retention fastener in response to movement of the installation fastener to the second position.

16. The method of claim 15, further comprising:
   forming the recess in the first tubular.

17. The method of claim 15, further comprising:
   providing, to a well site, the first tubular, the first tubular having the key installed within the recess and being secured to the first tubular via the retention fastener and the installation fastener.

18. The method of claim 15, wherein at least one of the retention fastener or the installation fastener comprises a bolt.

* * * * *